United States Patent Office 2,977,290
Patented Mar. 28, 1961

2,977,290

SEPARATION PROCESS

Lars E. Molander, St. Albans, W. Va., assignor to Union Carbide Corporation, a corporation of New York No Drawing. Filed Dec. 5, 1957, Ser. No. 700,733

1 Claim. (Cl. 202—42)

This invention relates to the separation of the components of an admixture by azeotropic distillation. In a particular aspect, this invention relates to the removal of normal butanol from normal butyl chloride, and it more specifically relates to the separation of butyl chloride from a crude reaction mixture formed by reacting butanol and hydrogen chloride.

Normal butyl chloride is a commercially important chemical material which is widely used in the pharmaceutical industry and other industries. In many of its large-scale applications, normal butyl chloride is employed as a starting material for the Grignard synthesis of butyl-tin compounds, which are used as light stabilizers for synthetic resins, and for the synthesis of other compounds used as gasoline additives. In a Grignard type of synthesis, the presence of any alcohol in the reaction medium is significant, because even small amounts of alcohols adversely affect the rate and efficiency of the reaction, and the yield of product.

For these reasons, normal butanol has proven to be one of the most troublesome impurities in commercially produced normal butyl chloride, and during the commercial history of this latter compound the product specifications have become increasingly stringent in regard to allowable normal butanol content.

The conventional method of refining normal butyl chloride from a crude product mixture has consisted of two batch distillations. In the first distillation, water and the unwanted secondary, tertiary, and isobutyl isomers of normal butyl chloride are removed first, and dry normal butyl chloride containing approximately 1 to 5 percent by weight of butanol is taken off next. In the second distillation, the dry normal butyl chloride containing the lowered amount of normal butanol is redistilled to reduce the normal butanol content to 0.8 percent by weight. The excess normal butanol is left behind in the still residue, which is recycled to the next distillation.

Other methods may be employed to reduce the 1 to 5 percent by weight of normal butanol contained in semi-refined normal butyl chloride to a commercially acceptable content, but these methods are relatively cumbersome and expensive. In one method, the alcohol is esterified with boric acid to form butyl borate, and from this mixture normal butyl chloride is removed by distillation. The acid and normal butanol are recovered by saponification followed by distillation. This procedure requires four major steps in addition to the preliminary rectification of the original crude mixture to reduce the normal butanol content from about 20 percent to about 1 to 5 percent. In another method, the normal butanol is extracted from the crude mixture with water, but this requires large volumes of water because of the low solubility of normal butanol in water, and subsequent distillation of the resulting raffinate to recover the alcohol requires an excessive amount of heat. In still another method, the normal butanol impurity is reacted with sodium hydroxide at the boiling point to form sodium butylate but this is not satisfactory due to the low solubility of the alkali in the alcohol.

Accordingly, it is an object of this present invention to provide a convenient and economical method for purifying normal butyl chloride.

Another object is to provide a novel and improved method for reducing the content of normal butanol in commercially-produced normal butyl chloride so as to satisfy the product specifications for allowable normal butanol content.

Various other objects and advantages of the present invention will become apparent to those skilled in the art from the accompanying disclosure and description.

This invention is based on the discovery that normal butanol and normal butyl chloride are readily separated by subjecting mixtures containing the same to azeotropic distillation in the presence of water as an entraining agent. A sufficient amount of water is employed to allow the separate recovery of normal butanol-water and normal butyl chloride-water binary azeotropes as overhead distillate fractions. On separating the water layer from the normal butyl chloride-water distillate fraction, there is obtained normal butyl chloride which contains not more than 0.3 percent by weight of normal butanol.

This simple and economical method for purifying normal butyl chloride was not apparent based on previous experience in the art. It was considered impractical to heat normal butyl chloride for long periods of time in the presence of water because of the expectation that hydrolysis would occur and the hydrochloric acid produced would be destructive to the equipment. Further, the literature has published data identifying a homogeneous azeotrope of normal butanol and normal butyl chloride that boils at 77.7° C. and contains 1.9 percent by weight of normal butanol. This boiling point is close to that of the normal butyl chloride-water azeotrope, so, on this basis, it would appear impractical to attempt to separate normal butanol from normal butyl chloride in the presence of water.

In the development of the refining method of this invention, it was found that, contrary to expectations, normal butyl chloride may be heated in the presence of water for distillation purposes without causing the compound to hydrolyze to normal butanol and hydrochloric acid; and, also, it was shown by accurate gas chromatographic analysis of distillate vapors that a homogeneous azeotrope of normal butanol and normal butyl chloride boiling at 77.7° C. does not exist.

The various azeotropes that form at atmospheric pressure when a typical crude normal butyl chloride mixture is distilled in the presence of water were found to have boiling points which allow the easy separation of a refined normal butyl chloride-water heterogeneous azeotrope fraction boiling at 68° C. A normal butyl chloride-water azeotrope contains 93% by weight of normal butyl chloride and 7% water. An isobutyl chloride-water heterogeneous azeotrope boils at 61.6° C. and contains 96.7% by weight of isobutyl chloride and 3.3% water. A secondary butyl chloride-water heterogeneous azeotrope boils at about 62° C., and a tertiary butyl chloride-water azeotrope boils at a lower temperature than these other branched-chain butyl chloride azeotropes but is removed with them in the same distillate fraction. A normal butanol-di-normal butyl ether-water heterogeneous azeotrope boils at 90.6° C. and contains 35.4% by weight of normal butanol, 36.4% dibutyl ether and 28.2% water. A normal butanol-water heterogeneous azeotrope boils at 93° C. and contains 55.5% by weight of normal butanol and 45.5% water. A di-normal butyl ether-water heterogeneous azeotrope boils at 94.1° C. and contains 66.3% by weight of dibutyl ether and 33.7% water. A di-normal butyl ether-butanol homogeneous azeotrope boils at 117.4° C. and contains 82.5% by weight of dibutyl ether and 17.5% butanol.

The normal butyl chloride product mixtures which are particularly amenable to the purification method of this invention are those which are produced in large-scale commercial operations. In a typical operation of this kind, normal butyl chloride is produced by adding hydrogen chloride to hot, liquid normal butanol in the presence of a catalyst such as zinc chloride. The crude product, which issues from the reactor as a vapor, and is condensed for recovery, consists of about 60 percent by weight of normal butyl chloride and about 20 percent normal butanol. The remainder of this product mixture consists of di-normal butyl ether and small amounts of secondary, tertiary and isobutyl chlorides, plus a small amount of dissolved water.

In a typical application of the method of this invention for purifying crude normal butyl chloride, a still is charged with crude normal butyl chloride (e.g., containing 60 percent normal butyl chloride, 20 percent normal butanol, 19 percent di-normal butyl ether, and 1 percent secondary, tertiary and isobutyl chlorides and dissolved water) and water, in the ratio of four volumes of crude normal butyl chloride to one volume of water. Heat is applied to the still to vaporize the liquid contents, and the vapors pass upward through a rectifying column of the equivalent of ten theoretical plates. The vapors pass out of the column into a condenser, and the condensate formed is collected in a liquid separator such as a decanter. The heterogeneous azeotropic fractions separate into a lower water layer and an upper organic layer. Throughout most of the distillation operation, the water layer is returned continuously to the head of the rectifying column as reflux. The upper organic layer in the liquid separator is removed as product. The first fraction removed as organic layer is impure normal butyl chloride contaminated with the other isomeric butyl chlorides; this fraction is recycled to subsequent refining distillations. Thus, secondary (B.P. 66.5° C.), iso-(B.P. 68.5° C.) and tertiary (B.P. 51.5° C.) butyl chlorides are removed first by reason of their higher vapor pressures, at a reflux ratio of about 5:1.

After all of the unwanted isomeric butyl chlorides have been removed, as indicated by the physical properties of the condensate stream, a normal butyl chloride-water binary azeotrope begins to distill over as the next fraction. This distillate is diverted to refined normal butyl chloride receivers at a reflux ratio of about 2:1 for the organic layer.

After all of the refined normal butyl chloride has been removed in this fashion, as shown by a sharp increase in temperature at the bottom of the rectifying column, a third organic layer fraction is taken to another receiver, at a reflux ratio of 3:1, until the vapor temperature at the head of the rectifying column indicates that only the azeotropes of normal butanol-water and normal butanol-dibutyl ether-water are present in the condensed vapors.

The third fraction organic layer is removed at this point, and the third fraction water layer which is saturated with butanol is saved for recycling to subsequent distillations, or for furnishing the necessary added water for a still charge.

The distillation is continued until the vapor is free of water, as indicated by the vapor temperature. Then a homogeneous azeotrope fraction consisting of di-normal butyl ether and normal butanol is collected as distillate at a reflux ratio of 1:2. This fraction can be recirculated to a reactor where normal butyl chloride is produced by the reaction between normal butanol and hydrogen chloride, and by the reaction between di-normal butyl ether and hydrogen chloride.

The above procedure is satisfactory when it is desirable to recover a dry mixture of normal butanol and di-normal butyl ether as a distillate fraction. If the recovery of this dry fraction is not required, then the distillation can be modified to yield the refined materials more quickly and economically. In this modified procedure, the refined normal butyl chloride is removed by azeotropic distillation with water as in the above method. All the remaining organic material in the still is collected in a broad fraction boiling between approximately 70° and 100° C. without reflux flow to the rectifying column. The water layer of the condensed azeotropes is returned to the still during the distillation of this broad fraction. The water remains in the still as the necessary added water for the next charge to be refined.

It is essential in the azeotropic distillation refining method of this invention that the presence of water be maintained during the operation. Water must be present at least during the distillation of the isomeric butyl chloride fraction and the normal butyl chloride fraction, and this water should be present in an amount sufficient to sustain the continuous removal of azeotropes. The minimum amount of water that may be employed is 1 percent by volume or thereabouts, and the maximum volume of water that may be added to the charge is limited only by practical considerations. However, for the average crude normal butyl chloride product mixture that contains normal butanol, it is preferred to use between about 7 percent and 30 percent by volume of water based on the volume of organic charge. For the kind of charge mixture and the particular refining procedures described above, the optimum volume added to the still is about 18 percent by volume to insure proper temperature balance and rate of distillation.

The method of this invention is applicable to the refining of any crude normal butyl chloride prepared by conventional synthetic methods, but it is particularly valuable for purifying normal butyl chloride product mixtures containing normal butanol and isomeric butyl chlorides.

The composition of the crude normal butyl chloride mixture mentioned previously is typical of a product produced commercially by the reaction between hydrogen chloride and normal butanol. Other normal butyl chloride mixtures produced by this method or other methods may have different proportions of undesirable components or different kinds of contaminants.

The relative efficiency of the refining distillations will, of course, depend on the type of rectifying column used and on the respective reflux ratios of distillate fractions. In general, a rectifying column equivalent to about at least four theoretical plates, and preferably about eight theoretical plates, is adequate for satisfactory results. The particular reflux ratio used for collecting a particular distillate fraction will vary in a manner depending on the efficiency of the rectifying column and on the kind of material being collected and the purity desired. For example, if crude normal butyl chloride, containing isomeric butyl chlorides and normal butanol, is being distilled through a ten theoretical plate column, then the refined butyl chloride fraction should not reflux at a ratio lower than 2 in order to obtain refined normal butyl chloride of 0.2 percent normal butanol content; and if the reflux ratio is raised to 6:1 then normal butyl chloride of 0.06 percent normal butanol content is recoverable. Also, it is best to maintain a high reflux ratio on the forefraction in order to obtain better separation of the isomeric chlorides and to keep the volume of this fraction at a minimum.

The following example illustrates a particular embodiment of the method of this invention.

*Example*

A batch still of 12,000 gallon capacity is charged with 10,000 gallons of crude normal butyl chloride (analysis by weight is 60 percent normal butyl chloride, 20 percent normal butanol, 19 percent di-normal butyl ether, and 1 percent secondary, tertiary, and isobutyl chlorides, and water). Soda ash to the amount of about 0.05 percent by weight based on the organic material is added to neutralize any residual acidity, e.g., hydrogen chloride, and 2,000 gallons of water is added to complete the charge.

Heat is applied to the kettle charge to vaporize the contents and a forefraction of top (organic) layer is collected as condensate at a reflux ratio of 5:1 (organic layer basis) while all the bottom (water) layer is returned to the top of the rectifying column. This first fraction, amounting to about 300 gallons total, and containing about 50 percent isomeric butyl chlorides and 50 percent normal butyl chloride, is collected at the rate of 50 gallons per hour and is disposed of by burning.

This first fraction is collected until the vapor temperature rises to 66°–67° C. and the specific gravity of the organic layer is 0.884–0.887 at 20/20° C. which indicates that the vapors are those of the heterogeneous normal butyl chloride-water binary azeotrope. At this point, the organic layer condensate is diverted to a clean, dry receiver at a reflux ratio of 2:1 (organic basis) at a rate of 300–400 gallons per hour. The refined normal butyl chloride amounts to about 5,000 gallons. The water layer of this azeotrope distillate fraction is all returned to the still.

A third organic fraction is collected in another receiver at a reflux ratio of 3:1 (organic basis) and a rate of 100 gallons per hour. This fraction is begun as soon as a sharp rise in the base column temperature indicates that the still kettle has been substantially stripped of normal butyl chloride, and it is continued until the vapor temperature rises to 89°–90° C., which indicates that a mixture of normal butanol-di-normal butyl ether-water and normal butanol-water azeotropes are present in the vapor. The organic layer of this third fraction amounts to about 500 gallons, and it consists of normal butyl chloride, normal butanol and di-normal butyl ether. The water layer is returned to the rectifying column throughout the distillation of this fraction.

The next fraction is taken off as rapidly as possible until the vapor temperature rises to about 105° C. which indicates that the vapor is free of water. The organic layer of this fraction is returned to the head of the rectifying column as reflux during this removal of water from the still. This recovered water fraction is about 2,000 gallons in volume and is saturated with normal butanol.

As a last fraction, about 3,700 gallons of an approximately 50–50 mixture by weight of normal butanol and di-normal butyl ether (and a small amount of normal butyl chloride) is distilled from the still until the column temperature differential drops off sharply.

The residue remaining in the still kettle is composed of soda ash and salts and about 500 gallons of dibutyl ether.

What is claimed is:

A method of purifying crude normal butyl chloride containing more than about 0.3 percent by weight of normal butanol which comprises distilling said crude normal butyl chloride in the presence of between about 7 percent and 30 percent by volume of water added as an entraining agent, and recovering a separate normal butyl chloride-water heterogeneous azeotrope fraction with a reduced normal butanol content of less than 0.3 percent normal butanol.

References Cited in the file of this patent

UNITED STATES PATENTS

| | | |
|---|---|---|
| 1,852,063 | Ricard | Apr. 5, 1932 |
| 2,122,110 | Olin et al. | June 28, 1938 |
| 2,516,638 | McCurdy | July 25, 1950 |
| 2,570,495 | Scott | Oct. 9, 1951 |